(12) United States Patent
Schaefers et al.

(10) Patent No.: US 9,133,881 B2
(45) Date of Patent: Sep. 15, 2015

(54) RADIAL ROLLER BEARING ASSEMBLY, IN PARTICULAR FOR A NEEDLE BUSH

(75) Inventors: Heinz Schaefers, Erlangen (DE); Johannes Enders, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/237,653

(22) PCT Filed: May 7, 2012

(86) PCT No.: PCT/EP2012/058333
§ 371 (c)(1),
(2), (4) Date: Feb. 7, 2014

(87) PCT Pub. No.: WO2013/020727
PCT Pub. Date: Mar. 14, 2013

(65) Prior Publication Data
US 2014/0177992 A1   Jun. 26, 2014

(30) Foreign Application Priority Data

Aug. 10, 2011   (DE) .......................... 10 2011 080 744

(51) Int. Cl.
*F16C 33/78*   (2006.01)
*F02M 25/07*   (2006.01)
(Continued)

(52) U.S. Cl.
CPC ............ *F16C 33/7853* (2013.01); *F02D 9/106* (2013.01); *F02M 25/0793* (2013.01); *F02M 25/0797* (2013.01); *F16C 19/463* (2013.01); *F16C 19/466* (2013.01);
(Continued)

(58) Field of Classification Search
CPC .................................................. F16C 33/7809
See application file for complete search history.

(56) References Cited

U.S. PATENT DOCUMENTS 3,510,182 A * 5/1970 Cowles .......................... 384/484
4,385,789 A * 5/1983 Batt .............................. 384/482
(Continued)

FOREIGN PATENT DOCUMENTS

DE   1888002   7/1967
DE   1575697   1/1970
(Continued)

*Primary Examiner* — Thomas R. Hannon
(74) *Attorney, Agent, or Firm* — Volpe and Koenig, P.C.

(57) ABSTRACT

A radial roller bearing assembly, in particular for a needle bush (1), which substantially comprises a thin-walled outer ring (4), which can be inserted into a bore (2) or a housing (3), having two ribs (5, 6) directed radially inward, and a needle cage assembly (7) that is held in the outer ring (4) by said ribs (5, 6). According to the invention, the needle cage assembly (7) is formed by a needle cage (8) and a plurality of bearing needles (9) guided therein in the circumferential direction at regular distances, which roll on the inner shell surface (10) of the outer ring (4) and on the outer shell surface (11) of a shaft (12) to be borne or a separate inner ring. Furthermore, at least two seals (15, 16) are arranged axially next to the side surfaces (13, 14) of the needle cage (8) which protect the needle bush (1) from contamination from the outside and from the loss of lubricant. According to the invention, at least one of the seals (15 or 16) is formed as a multi-lip seal, made of an elastomer, consisting of a single ring, which extends over the part of the inner shell surface (10) of the outer ring (4) arranged between the related rib (5 or 6) of the outer ring (4) and the adjacent side surface (13 or 14) of the needle cage (8) and over the inner shell surface (17), the face (18) and the outer shell surface (19) of the rib (5 or 6).

7 Claims, 2 Drawing Sheets

(51) Int. Cl.
*F02D 9/10* (2006.01)
*F16C 19/46* (2006.01)
(52) U.S. Cl.
CPC ........ *F16C 33/7809* (2013.01); *F16C 2360/22* (2013.01); *F16C 2361/91* (2013.01); *Y02T 10/121* (2013.01)

(56) References Cited

U.S. PATENT DOCUMENTS

| | | | |
|---|---|---|---|
| 4,613,317 | A * | 9/1986 | Morihiro ........................ 384/486 |
| 7,758,251 | B2 * | 7/2010 | Akamatsu ...................... 384/564 |
| 2008/0207339 | A1 | 8/2008 | Jauernig et al. |
| 2009/0317031 | A1 * | 12/2009 | Pfundt et al. .................. 384/569 |
| 2014/0185976 | A1 * | 7/2014 | Enders .......................... 384/486 |

FOREIGN PATENT DOCUMENTS

| | | |
|---|---|---|
| DE | 7035926 | 9/1970 |
| DE | 2221234 | 11/1973 |
| DE | 6908931 | 7/1988 |
| DE | 4235117 | 4/1994 |
| DE | 102006053716 | 5/2008 |
| FR | 1357455 | 4/1964 |
| GB | 1353679 | 5/1974 |

* cited by examiner

RADIAL ROLLER BEARING ASSEMBLY, IN PARTICULAR FOR A NEEDLE BUSH

FIELD OF THE INVENTION

The invention relates to a radial roller bearing assembly which can be realized, in particular, advantageously at bearing points which are configured with sealed needle bushes.

BACKGROUND

It is generally known in antifriction bearing technology that needle bushes are the design of needle bearings which have the smallest radial overall height and make bearings possible which are particularly space-saving and simple to assemble with a high radial load-bearing capability. They are used in virtually all areas of the technology and comprise substantially a thin-walled outer ring which can be inserted into a housing hole and has two radially inwardly directed rims on its axial sides, and a needle ring which is held in the outer ring by said rims and is formed by a needle cage and a multiplicity of bearing needles which are guided in the latter at uniform spacings in the circumferential direction. Here, the bearing needles roll on the inner circumferential face of the outer ring, which inner circumferential face is configured as a raceway, and on the outer circumferential face of the shaft to be mounted, which outer circumferential face is likewise configured as a raceway, or, if the shaft cannot be configured as a raceway, on the outer circumferential face of a separate inner ring. Moreover, in the case of sealed needle bush embodiments, at least two seals are arranged axially next to the side faces of the needle cage within the needle bush, which seals are known in a multiplicity of various embodiments and protect the needle bush against contaminants from the outside and the loss of lubricant.

It is known, for example, from DE 42 35 117 A1 and DE 10 2006 053 716 A1 to seal a needle bush by way of two lip seals which are arranged on both sides next to the needle cage, are of C-shaped profile cross section, and one profile limb of which bears against that part of the inner circumferential face of the outer ring which is arranged between the respective rim and the needle cage, whereas the other profile limb of which, which points in each case toward the rims of the outer ring, rests rubbingly on the circumferential face of the shaft which is to be mounted.

Furthermore, it is known from DE 1 888 002 U1 to use two rubber seals which have a horizontal Z-profile in cross section as seals for a needle bush, which rubber seals seal with their free ends of one radial profile limb in each case the angled regions between the inner circumferential face of the outer ring and the rims and rest rubbingly with their other ends on the circumferential face of the shaft which is to be mounted. The adjoining profile web of said seals then extends obliquely upward into the interior of the needle bush, in each case as far as below the needle cage, and the adjoining second radial profile limb likewise rests rubbingly with its free end on the circumferential face of the shaft which is to be mounted.

Moreover, it is also known from DE 6 908 931 U1 and DE 7 035 926 U1 to arrange a seal on the end face of a radial rim of a needle bush. In DE 6 908 931 U1, said seal is configured here as a rubber sealing ring which is vulcanized on and has a shoulder which bears against the end face of the rim and a collar which protrudes into the needle bush and on which a sealing lip is formed integrally which rests rubbingly on the circumferential face of the shaft which is to be mounted. In DE 7 035 926 U1, in contrast, the seal is formed by a separate rubber lip seal which, on its upper side, has a circumferential annular groove for plugging the seal onto the rim end face and, on its underside, has one or more sealing lips which rests/rest rubbingly on the circumferential face of the shaft which is to be mounted.

Furthermore, it is known from DE 2 221 234 A1, in order to seal a needle bush, to insert two sealing rings which have a horizontal U-profile in cross section into the outer ring in such a way that they bear with an axial profile limb and their radial profile web against the inner circumferential face of the outer ring and against the inner circumferential face of the rims. The second profile limb of said sealing rings which adjoins the profile web is configured as a sealing lip arm which protrudes into the needle bush, at the end of which sealing lip arm a sealing lip is integrally formed which is shaped as a V-profile and into which a tension spring or a resilient ring which braces the sealing lip against the shaft which is to be mounted is inserted.

Finally, it is also known from DE 1 575 697 A1 to seal a needle bush by way of seals which are arranged on the outer circumferential face of the rims of the outer ring. To this end, the rims in each case have an axially inwardly directed right-angled bend with a circumferential sealing ring which is vulcanized on, has various straight or angular profile cross sections and is configured with one or more sealing lips which is/are in sealing contact rubbingly with the shaft which is to be mounted. In the embodiments with angular profile cross sections, moreover, the sealing ring extends along the end face of the rims as far as into the interior of the needle bush and has a single sealing lip at the end of one or the other profile limb.

All the above-described solutions have the common disadvantage, however, that the seals which are used do not have a sufficient sealing action, in order for it to be possible to use them as needle bushes which are configured as a throttle valve bearing for pivotably mounting the throttle valve shaft of a regulating device for exhaust gas recirculation in internal combustion engines. The reason for this is that throttle valve bearings of this type in exhaust gas recirculation regulating devices are subjected to correspondingly increased amounts of exhaust gas condensates as the amounts of what are known as blow-by gases increase, which exhaust gas condensates penetrate via the housing holes for the throttle valve shaft to the throttle valve bearings. Said exhaust gas condensates have a composition which is from oily/watery to watery/acidic, with the result that the needle bushes which as a rule are composed of a hardened roller bearing steel are subjected first of all to intensified attack from external corrosion which continues as far as into the interior of the needle bushes even in the case of multiple sealing of said needle bushes by way of known seals. Here, the condensate first of all forms a rust layer on the outer rims of the needle bushes, which rust layer, during further advancing of the corrosion, spreads out over the end faces of the rims by way of rust infiltration of the seals as far as into the interior of the needle bushes, with the result that damage and the failure of the throttle valve bearings associated with the functional failure of the throttle valve occur.

SUMMARY

Proceeding from the described disadvantages of the solutions of the known prior art, the invention is therefore based on the object of designing a radial roller bearing assembly, in particular for a needle bush, in which the seals which are used have a sealing action against external corrosion such that the needle bush is also suitable as a throttle valve bearing for pivotably mounting the throttle valve shaft of a regulating device for exhaust gas recirculation in internal combustion engines.

According to the invention, this object is achieved in a radial roller bearing assembly in which at least one of the seals is configured as a multiple-lip seal which is made from an elastomer, comprises a single ring and extends over that part of the internal circumferential face of the outer ring which is arranged between the associated rim of the outer ring and the adjacent side face of the needle cage and over the internal circumferential face, the end face and the outer circumferential face of the rim.

Preferred refinements and advantageous developments of the radial roller bearing assembly which is configured according to the invention are described below.

According to one embodiment, the realization of the radial roller bearing assembly which is configured according to the invention requires first of all that that rim of the outer ring which is enclosed by the seal which is configured as a multiple-lip seal is of radially shortened configuration and, in front of said rim, the hole in the housing is produced with an additional step for receiving a seal. Although this means that both the outer ring of the needle bush and the housing hole have to be modified slightly in comparison with the previously known embodiments, the modifications should be zero cost as far as possible, since said modifications have no influence on the previous manufacturing processes for the outer ring and the housing hole by way of deep drawing and by way of drilling or milling, respectively.

In a further refinement, the seal which is configured as a multiple-lip seal on the needle bush of the radial roller bearing assembly which is configured according to the invention is also distinguished by the fact that it is configured with a basic profile part which virtually fills the space between the rim of the outer ring and the side face of the needle cage and has a first radial sealing lip which is in sealing contact with the shaft. Said basic profile part is then adjoined by a profile limb which extends below the end face of the rim of the outer ring as far as in front of the rim and has a second radial sealing lip which is in sealing contact with the shaft and at the end of which finally a third radial sealing lip is also arranged which is in sealing contact with the additional step of the hole in the housing. Here, said third sealing lip is advantageously set obliquely with respect to the radial circumferential face of the step in the housing hole, with the result that a rise in the pressure which acts from outside on the sealing lip automatically brings about an increase in the sealing force of said sealing lip. A configuration of this type of the seal with three sealing lips and the likewise sealing basic body has as a rule proved sufficient to avoid external corrosion on the needle bush, but it would also be conceivable to configure the seal with further sealing lips with respect to the shaft or with respect to the step in the housing hole.

It is also an expedient development of the seal which is configured as a multiple-lip seal on the needle bush of the radial roller bearing assembly which is configured according to the invention that a circumferential annular groove is additionally arranged in the cage-side side face of the basic profile part of the seal, which annular groove is provided to increase the elasticity of the first radial sealing lip which is formed integrally on said basic profile part.

By way of the described embodiment, the radial roller bearing assembly which is configured according to the invention therefore has the advantage in comparison with the radial roller bearing assemblies which are known from the prior art that, as a result of the complete enclosure of the rims of the needle bush and as a result of the virtually complete filling of the space between the rim of the outer ring and the side face of the needle cage, the seals which are used have a sealing action against external corrosion such that the needle bush is also suitable as a throttle valve bearing for pivotably mounting the throttle valve shaft of a regulating device for exhaust gas recirculation in internal combustion engines.

BRIEF DESCRIPTION OF THE DRAWINGS

In the following text, the radial roller bearing assembly which is configured according to the invention will be explained in greater detail in two preferred embodiments with reference to the appended drawings, in which.

DETAILED DESCRIPTION OF THE PREFERRED EMBODIMENTS

Figure 1:
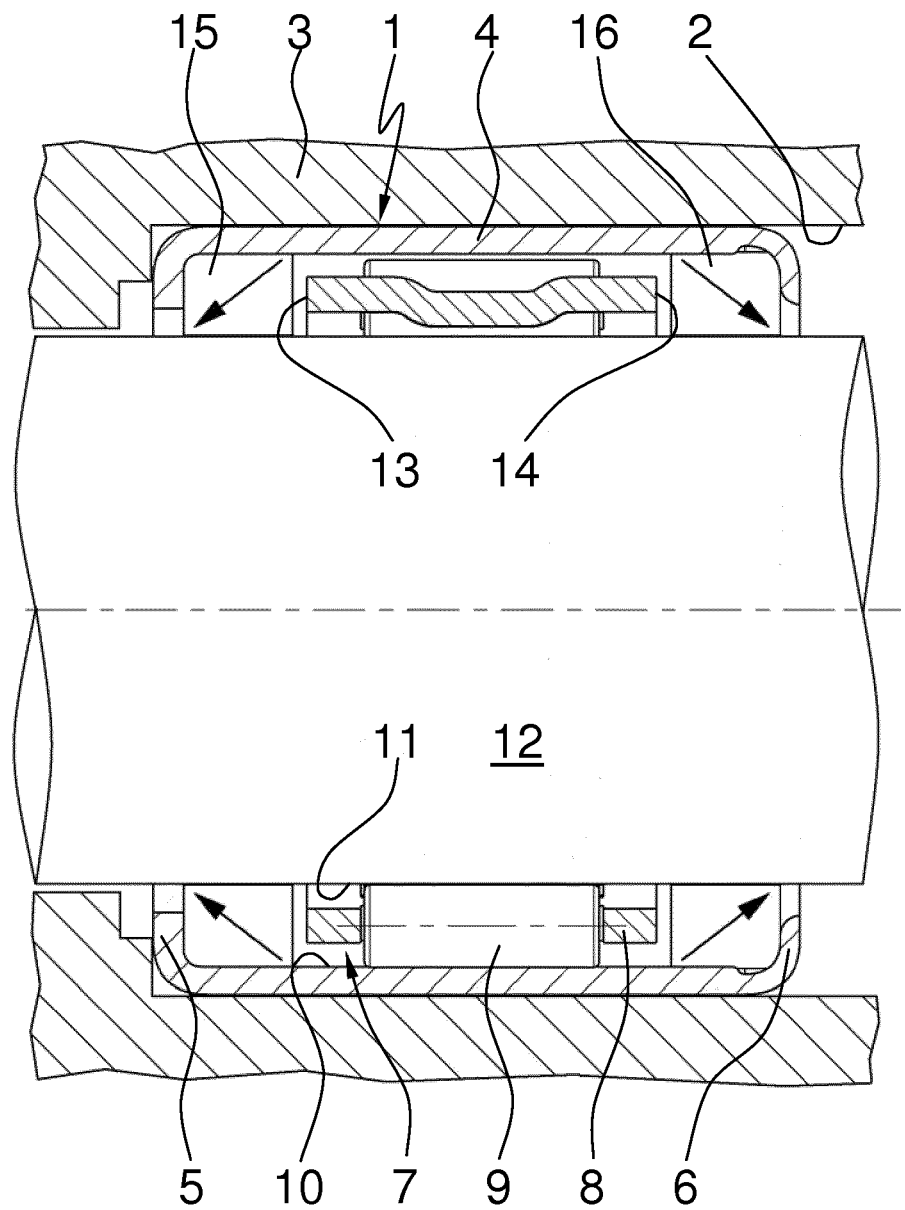
FIG. 1 shows a cross section through a bearing arrangement, configured according to the invention, of a sealed needle bush.

A bearing arrangement for a needle bush 1 is clearly apparent from FIG. 1, which bearing arrangement is configured as a throttle valve bearing for pivotably mounting the throttle valve shaft of a regulating device for exhaust gas recirculation in internal combustion engines. This needle bush 1 comprises substantially a thin-walled outer ring 4 which is inserted into a hole 2 of a housing 3 and has two radially inwardly directed rims 5, 6 on its axial sides, and a needle ring 7 which is held in the outer ring 4 by said rims 5, 6. Here, the needle ring 7 is formed by a needle cage 8 and a multiplicity of bearing needles 9 which are guided in the latter at uniform spacings in the circumferential direction and roll on the inner circumferential face 10 of the outer ring 4 and on the outer circumferential face 11 of a shaft 12 which is to be mounted. Moreover, two seals 15, 16 which protect the needle bush 1 against contaminants from the outside and the loss of lubricant and are initially shown only diagrammatically in FIG. 1 are arranged axially next to the side faces 13, 14 of the needle cage 8.

Figure 2:
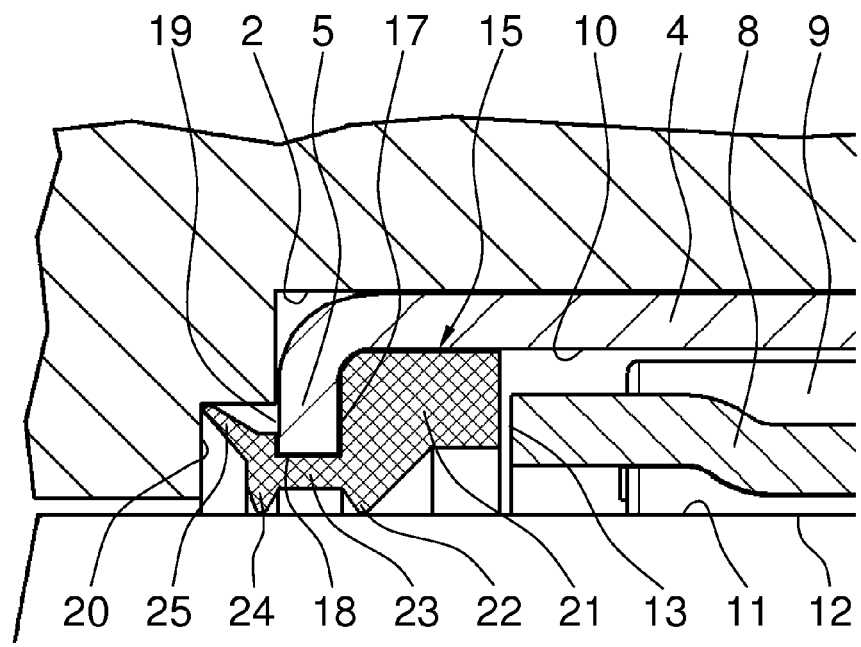
FIG. 2 shows an enlarged illustration of a first embodiment of a seal for the bearing arrangement according to the invention in accordance with FIG. 1.
Figure 3:
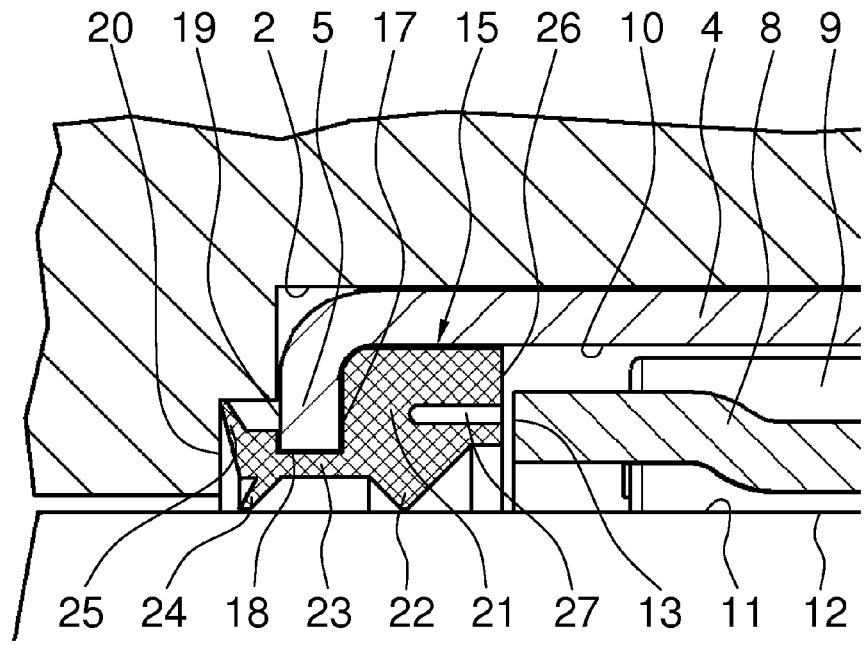
FIG. 3 shows an enlarged illustration of a second embodiment of a seal for the bearing arrangement according to the invention in accordance with FIG. 1.

It can then be seen in FIGS. 2 and 3 that, in order to seal the needle bush 1 against that throughflow of exhaust gas condensates, at least the seal 15 which is arranged on its inflow side is formed according to the invention by a multiple-lip seal which is made from an elastomer, comprises a single ring, and extends over that part of the internal circumferential face 10 of the outer ring 4 which is arranged between the associated rim 5 of the outer ring 4 and the adjacent side face 13 of the needle cage 8 and at the same time over the inner circumferential face 17, the end face 18 and the outer circumferential face 19 of the rim 5. It can be seen clearly here in both figures that, for this purpose, first of all that rim 5 of the outer ring 4 which is enclosed by the seal 15 is of radially shortened configuration and secondly, in front of said rim 5, the hole 2 in the housing 3 has an additional step 20 for receiving a seal.

Furthermore, it is shown clearly in FIGS. 2 and 3 that the seal 15 which is configured as a multiple-lip seal is configured with a basic profile part 21 which virtually fills the space between the rim 5 of the outer ring 4 and the side face 13 of the needle cage 8 and has a first radial sealing lip 22 which is in sealing contact with the shaft 12. Said basic profile part 21 is then adjoined by a profile limb 23 which extends below the end face 18 of the rim 5 of the outer ring 4 as far as in front of the rim 5 and has a second radial sealing lip 24 which is in sealing contact with the shaft 12 and at the end of which finally a third radial sealing lip 25 is also arranged which is in sealing contact with the additional step 20 of the hole 2 in the housing 3 and is set obliquely with respect to the radial circumferential face of the step 20.

Finally, it is also apparent from FIG. 3 that the second embodiment which is shown therein differs from the first embodiment, shown in FIG. 2, of the seal 15 in that a circumferential annular groove 27 is additionally arranged in the cage-side side face 26 of the basic profile part 21 of the seal 15, which annular groove 27 is provided to increase the elasticity of the first radial sealing lip 22 which is formed integrally on said basic profile part 21.

LIST OF DESIGNATIONS

1 Needle bush
2 Hole in 3
3 Housing
4 Outer ring of 1
5 Rim on 4
6 Rim on 4
7 Needle ring of 1
8 Needle cage of 7
9 Bearing needles in 8
10 Inner circumferential face of 4
11 Outer circumferential face of 12
12 Shaft
13 Side face of 8
14 Side face of 8
15 Seal in 4
16 Seal in 4
17 Inner circumferential face of 5
18 End face of 5
19 Outer circumferential face of 5
20 Step in 2
21 Basic profile part of 15
22 First sealing lip on 21
23 Profile limb of 15
24 Second sealing lip on 23
25 Third sealing lip on 23
26 Side face of 21
27 Annular groove in 26

The invention claimed is:

1. A radial roller bearing assembly, comprising a substantially a thin-walled outer ring which is insertable into a hole of a housing and has two radially inwardly directed rims on axial sides thereof, a needle ring held in the outer ring by said rims formed by a needle cage and a multiplicity of bearing needles guided in the needle cage at uniform spacings in a circumferential direction that roll on an inner circumferential face of the outer ring and on an outer circumferential face of a shaft to be mounted or of a separate inner ring, at least two seals which protect the needle bush against contaminants from outside and loss of lubricant arranged axially next to side faces of the needle cage, at least one of the seals is configured as a multiple-lip seal made from an elastomer and comprises a single ring that extends over that part of the inner circumferential face of the outer ring which is arranged between the associated rim of the outer ring and an adjacent one of the side face of the needle cage and over an inner circumferential face, an end face and an outer circumferential face of the rim, and in front of said rim, the hole in the housing has an additional step for receiving the seal.

2. The radial roller bearing assembly as claimed in claim 1, wherein the rim of the outer ring which is enclosed by the seal which is configured as the multiple-lip seal is of radially shortened configuration.

3. The radial roller bearing assembly as claimed in claim 2, wherein the seal which is configured as the multiple-lip seal is configured with a basic profile part which virtually fills a space between the rim of the outer ring and the side face of the needle cage and has a first radial sealing lip which is in sealing contact with the shaft.

4. The radial roller bearing assembly as claimed in claim 3, wherein the basic profile part of the seal which is configured as the multiple-lip seal is adjoined by a profile limb which extends below the end face of the rim of the outer ring as far as in front of the rim and has a second radial sealing lip which is in sealing contact with the shaft.

5. The radial roller bearing assembly as claimed in claim 4, wherein a third radial sealing lip which is in sealing contact with the additional step of the hole in the housing is arranged at an end of the profile limb, adjoining the basic profile part, of the seal which is configured as the multiple-lip seal.

6. The radial roller bearing assembly as claimed in claim 3, wherein a circumferential annular groove for increasing an elasticity of the first radial sealing lip which is formed integrally on the basic profile part is arranged in a cage-side side face of said basic profile part of the seal which is configured as the multiple-lip seal.

7. The radial roller bearing assembly as claimed in claim 1, wherein the bearing assembly comprises a needle bush configured as a throttle valve bearing for pivotably mounting a throttle valve shaft of a regulating device for exhaust gas recirculation in internal combustion engines, said needle bush is configured for sealing against throughflow of exhaust gas condensates at least on an inflow side by way of the seal which is configured as the multiple-lip seal.

\* \* \* \* \*